United States Patent

Panster et al.

Patent Number: 5,484,869
Date of Patent: Jan. 16, 1996

[54] FORMED ORGANOSILOXANE AMINE COPOLYCONDENSATES, METHOD OF THEIR PREPARATION AND USE

[75] Inventors: Peter Panster, Rodenbach; Stefan Wieland, Offenbach, both of Germany

[73] Assignee: Degussa Aktiengesellschaft, Frankfurt, Germany

[21] Appl. No.: 427,719

[22] Filed: Apr. 21, 1995

Related U.S. Application Data

[63] Continuation of Ser. No. 556,486, Jul. 24, 1990, abandoned.

[30] Foreign Application Priority Data

Jul. 31, 1989 [DE] Germany .......................... 39 25 359.7

[51] Int. Cl.[6] .................................................. C08G 77/08
[52] U.S. Cl. ................................ 528/18; 528/21; 528/32; 528/30; 528/38; 528/41; 528/481
[58] Field of Search ......................... 528/38, 30, 32, 528/18, 21, 41, 481

[56] References Cited

U.S. PATENT DOCUMENTS 5,003,024  3/1991  Panster et al. .............................. 528/32

FOREIGN PATENT DOCUMENTS

| 0255321 | 3/1988 | European Pat. Off. . |
| 2155281 | 5/1973 | Germany . |
| 2357154 | 5/1975 | Germany . |
| 3120214 | 9/1984 | Germany . |
| 3800563 | 3/1989 | Germany . |

*Primary Examiner*—Melvyn I. Marquis
*Attorney, Agent, or Firm*—Beveridge, DeGrandi, Weilacher & Young

[57] ABSTRACT

Organosiloxane copolycondensates are disclosed and which are optionally cross-linked by means of cross-linking agents containing Si, Ti, Zr and/or Al and contain the units

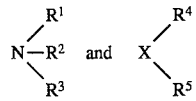

wherein $R^1$–$R^5$ are

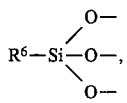

wherein
$R^6$ is alkylene with $C_1$–$C_{10}$ bound directly to N or X, cycloalkylene with $C_5$–$C_8$ or

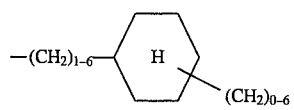

or

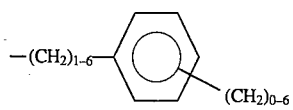

X is >N—H, >N—CH$_3$, >N—C$_2$H$_5$, —S—, —S$_2$—, —S$_3$—, —S$_4$—,

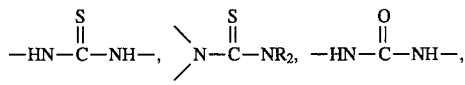

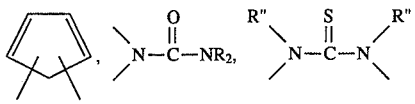

wherein R" is H or alkyl with $C_1$–$C_5$. These products are in the form of spherical particles with a diameter of 0.01 to 3.0 mm, a specific surface of up to 1000 m$^2$/g, a specific pore volume of up to 6.0 ml/g and a bulk density of 50 to 1000 g/l. Different methods of preparing the formed copolycondensates are disclosed as well as use of certain compositions for removing metals from solutions and/or for the adsorption of gaseous organic compounds and/or of water vapor.

39 Claims, No Drawings

FORMED ORGANOSILOXANE AMINE COPOLYCONDENSATES, METHOD OF THEIR PREPARATION AND USE

This application is a continuation of patent application Ser. No. 07/556,486, filed Jul. 24, 1990, which application is entirely incorporated herein by reference and is abandoned.

INTRODUCTION AND BACKGROUND

The present invention relates to macroscopic spherically formed copolycondensates of a tertiary organosiloxane amine with one or more siloxane components which exhibit process and application-technology advantages over previously developed organopolysiloxane copolycondensates (German patent application P 38 37 418 of Nov. 4, 1988). In another aspect, the present invention relates to methods according to which the new products can be manufactured not only in the spherical size and shape ideal for the particular applications but also with suitable physical qualities. In addition, methods of using these shaped organosiloxane amine copolycondensates constitute a further aspect of the invention.

Insoluble organosiloxane amines are described in German patent 31 20 214, which are distinguished by especially good chemical and physical properties, especially in comparison to analogous systems based on organic polymers as well as specially modified inorganic polymer systems. These organosiloxane amines can be used as weakly basic ion exchangers, as adsorbents, as active-substance carriers, as carriers of heterogenized complex catalysts or as heterogenous base in base-catalyzed reactions. The matrix of these products can be produced on a quasi made-to-measure basis as regards chemical and physical qualities and can thus be adapted to the requirements of the particular uses mentioned above by way of example. In order to do justice to the requirements of an industrial application, a forming or shaping method was also developed for these new polymers which makes it possible to produce these products not only in lumpy or powdery form but also in the advantageous spherical form. These formed organosiloxane amines are described in German patent application P 38 00 563.8. After it proved to be especially advantageous in various applications of the organosiloxanes to combine groups with different functions in one polymer matrix with each other, appropriate organosiloxane amine copolycondensates were developed and described in German patent application P 38 37 418.8. Synergistic effects, that is, actions which go beyond the sum of the actions of the individual components, can be produced by the combination of different functionalities, whereby at the same time other possibilities can be created by means of the different variants of the arrangement of the different functionalities in the polymer system, optionally in combination with cross-linking agents. However, it proved to be unfavorable in the meantime for these copolycondensates too that these products were previously able to be produced only in a relatively undefined geometric form and not in spherical form, which is advantageous for industrial application technology, with the desired physical and morphological qualities.

SUMMARY OF THE INVENTION

An object of the present invention therefore is to make available in a reproducible manner organosiloxane amine copolycondensates of the type described in German patent application P 38 37 418.8 in spherical form and with desired physical qualities. The invention solves this problem by means of the development of macroscopically spherical formed organosiloxane amine copolycondensates comprising units of the formula:

(I)

and of units of the formula

(II)

wherein $R^1$ to $R^5$ are identical or different and signify a group of the formula

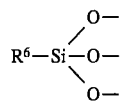
(III)

wherein $R^6$ is bound directly to the nitrogen atom or the double-bonded X group and represents a linear or branched alkylene group with 1 to 10 C atoms, a cycloalkylene group with 5 to 8 C atoms or a unit of the general formula

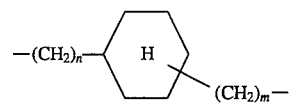

or

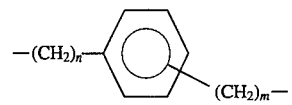

in which n is a number from 1 to 6 and indicates the number of methylene groups bound to nitrogen or to X and m is a number from 0 to 6.

wherein the free valences of the oxygen atoms bound to the silicon atom are saturated as in silica skeletons by silicon atoms of further groups of formula (III) and/or via the metal atoms in one or more of the cross-linking bridge-type cross-links

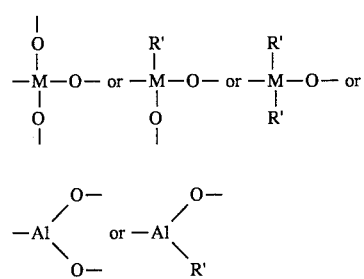
(IV)

M is a silicon, titanium or zirconium atom and R' a linear or branched alkyl group with 1 to 5 C atoms or a phenyl group and the ratio of silicon atoms from the groups of the formula (III) to the metal atoms in the bridge-type cross-links (IV) is 1:0 to 1:20 and

X=>N—H, >N—CH₃, >N—C₂H₅, —S—, —S₂—, —S₃—, —S₄—,

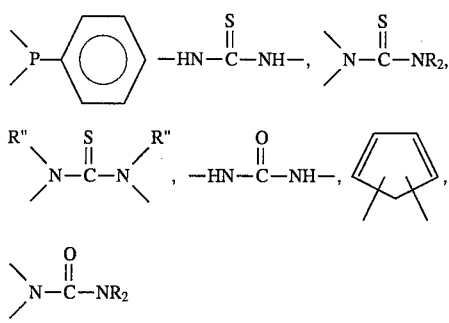

in formula II,
wherein R" is identical to H or is a linear or branched alkyl group with 1 to 5 C atoms or a group $(CH_2)_n$ —NR₂''' whereinby n signifies a number from 1 to 6 and R''' has the same meaning as R".

The macroscopically spherical particles have a diameter of 0.01 to 3.0, preferably 0.05 to 2.0 mm, a specific surface of up to 1000, preferably up to 700 m²/g, a specific pore volume of 0 to 6.0 ml/g as well as a bulk density of 50 to 1000 g/l, preferably 100 to 800 g/l.

In a more detailed aspect of the invention the formed organosiloxane copolycondensates have a ratio of units according to formula (I) to units according to formula (III) of from 0.03:99.97 to 99.99:0.01 mole %, preferably 5:95 to 95:5 mole %.

The formed organosiloxane copolycondensates of the invention can be in the form of so-called random copolycondensates, block copolycondensates or as mixed copolycondensates.

In a still more detailed aspect of the invention, R¹ to R⁵ represent a group of the general formula

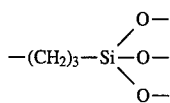

The ratio of the two components according to formula I and formula II can vary greatly and can be within the limits indicated above without this causing problems for the morphological, physical or chemical qualities of the products of the invention or for the method of production of the invention.

The ratio to be selected in practice depends primarily on the intended use of the particular copolycondensate and on the chemical and physical qualities required for this use, that is, e.g. on whether a high density of functional groups according to formula II is desired or not.

The monomeric structural elements of the formed organosiloxane amine copolycondensates are, in principle, known compounds, e.g. of the formulas
N[(CH₂)₃Si(OC₂H₅)₃]₃
S[(CH₂)₃Si(OCH₃)₃]₂
HN[(CH₂)₁₀Si(OC₂H₅)₃]₂
C₆H₅—P[(CH₂)₂Si(OCH₃)₃]₂
S₄[CH₂—C₆H₄—Si(OC₃H₇)₃]₂
Si(OC₂H₅)₄, Ti(OC₃H₇)₄
(N,N'-disubstituted and N,N,N'-/N,N',N'-trisubstituted organyloxysilyl-functional thioureas which exhibit a tertiary amine function in addition are described in German patent application P 39 25 356.2 (89 166 SO) of Jul. 31, 1989 as regards substance and possibilities of preparation.

The composition of the polymer units obtainable therefrom can be described by the formulas
N[(CH₂)₃SiO₃/₂]₃
S[(CH₂)₃SiO₃/₂]₂
HN[(CH₂)₁₀SiO₃/₂]₂
C₆H₅—P[(CH₂)₁₀SiO₃/₂]₂
S₄[CH₂—C₆H₄—SiO₃/₂]₂
SiO₄/₂, TiO₄/₂

The formed copolycondensates can be present even in the case of the identical chemical composition in totally different form as so-called random copolycondensate or as block copolycondensate or also as so-called mixed copolycondensate.

According to the invention, the formed copolycondensates can be present in each of the three named forms when practicing the forming methods of the invention as concerns the units according to formulas I, II and IV. This means that in the case of a purely random copolycondensate containing units according to formulas I and II and optionally also units according to formula IV, a random distribution of the components is given in accordance with the molar ratios of the initial products. Consideration must be taken of the silicon groupings according to formula III present in the case of the units according to formulas I and II and the functionality of the grouping of cross-linking agents according to formula IV. In the case of a so-called block copolycondensate, there is a building of blocks of the same units according to formulas I and II and optionally IV. Finally, a so-called mixed copolycondensate exhibits both structures of a random copolycondensate and also of a block copolycondensate. The units according to formula I or II or IV can be present thereby both as random as well as block copolycondensate.

Special advantages as concerns the availability of the initial materials and the material qualities are achieved with copolymers where R¹ to R⁵ are:

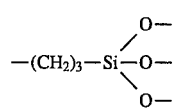

Another feature of the invention resides in preparing the copolycondensates as described above.

A method for the preparation of formed, random organosiloxane amine copolycondensates as described above comprises dissolving in a solvent a tertiary aminoorganosilane of the general formula

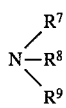

(V)

together with an organofunctional silane

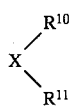

(VI)

corresponding to the desired stoichiometric composition of the copolycondensate to be prepared. That is an amount of each silane is selected so as to be sufficient to react with the other so as to produce the desired copolycondensate.

In the above, R⁷ to R¹¹ are identical or different and signify a group of the formula $$R^6—Si(OR^{12})_3 \quad (VII)$$

$R^6$ has the same meaning as in formula (III),
$R^{12}$ signifies a linear or branched alkyl group with 1 to 5 C atoms and
X has the same meaning as in formula (II).

Optionally, one or more cross-linking agents of the formula can be added:

$$M(OR)_{2-4}R'_{0-2} \text{ or } M(OR)_{2-3}R'_{0-1} \quad (VIII)$$

whereby M is a silicon, titanium, zirconium or aluminum atom,
R' a linear or branched alkyl group with 1 to 5 C atoms or a phenyl group and
R signifies a linear or branched alkyl group with 1 to 5 C atoms.

The ratio of silicon atoms from the groups of the general formula (VII) to the metal atoms in the cross-linking agents (VIII) is 1:0 to 1:20.

The solvent is largely water-miscible but is capable of dissolving aminoorganosilanes according to formula (V) and organofunctional silanes according to formula (VI) as well as cross-linking agents according to formula (VIII).

An amount of water is added to the solution under agitation which is at least sufficient for the complete hydrolysis and condensation reaction which takes place under the reaction conditions described herein. Then the reaction mixture is allowed to gel under further agitation at a certain temperature in a range from room temperature to 200° C. under the condition that it is compounded at the start of gelling or up to one hour thereafter with 10 to 2000, preferably 50 to 500% by weight of solvent, relative to the total amount of aminoorganosilane (V), organofunctional silane (VI) and, optionally, cross-linking agents (VIII). The solvent is largely water-insoluble but is capable of dissolving the reaction mixture which has gelled or started to gel. The reaction mixture is homogenized to form a homogenizate. In addition, 10 to 2000, preferably 50 to 500% by weight of water, relative to the total amount of aminoorganosilane (V), organofunctional silane (VI) and, optionally, cross-linking agents (VIII), is added to the viscous homogenizate immediately or within a time frame of up to 3 hours, optionally under increased temperature over the originally set temperature. The organic phase, which now contains the siloxane, is dispersed in the liquid two-phase system and the solid siloxane which is formed in the reaction in the shape of spheres is separated from the liquid phase after a reaction time sufficient for this purpose at room temperature to 200° C. The solid product is then optionally extracted, dried at room temperature to 250° C., optionally under protective gas or in a vacuum and tempered 1 to 100 hours at temperatures from 150° C. to 300° C. and/or classified according to size.

Suitable organic solvents for purposes of the invention used in the hydrolysis reaction are lower alkanols such as methanol, ethanol, n- and i-propanol, n- and i-butanol or n-pentanol, alone or in mixture.

Preferably, the hydrolysis is carried out with an excess of water.

In a further detailed aspect of the invention a linear or branched alcohol with 4 to 12 C atoms, toluene or o-, m-, p-xylene is added individually or in a mixture to the reaction mixture which has gelled or started to gel.

In principle, instead of the alkoxysilylamine compounds, the corresponding halogenide compounds or phenoxy compounds can also be used as initial material for the method; however, their use offers no advantages but rather can, e.g. in the case of the chlorides, cause problems due to the hydrochloric acid released during the hydrolysis.

The hydrolysis of initial material and optionally of cross-linking agents must be carried out in a solvent which is largely water-miscible but dissolves the initial materials. As mentioned above, preferably alcohols are used which correspond to the alkoxy groupings in the monomeric precursors of the initial materials or on the metal atoms of the optionally used cross-linking agents. Methanol, ethanol-, n- and i-propanol, n- and i-butanol or n-pentanol are especially suitable. Mixtures of such alcohols can also be used as solvent in the hydrolysis. Instead of alcohols, other polar solvents which are largely water-miscible can also be used; however, this turns out not to be very logical for engineering reasons on account of the solvent mixture which arises with the alcohol split off hydrolytically.

The hydrolysis is preferably carried out with an excess of water over the amount stoichiometrically required. The amount of water necessary for hydrolysis depends on the hydrolysis speed of the particular aminorganosilane used or on the cross-linking agent in such a manner that as the amount of water increases, a more rapid hydrolysis occurs; however, an upper limit can be set by separation which occurs and by the formation of a two-phase system. A hydrolysis in homogenous solution is basically to be preferred. Due to the two aspects named, somewhat less water is used in practice according to weight than organosilanes plus cross-linking agents.

The duration of the hydrolysis is a function of the tendency to hydrolyze of initial material and/or of cross-linking agents and of the temperature. The readiness to hydrolyze and therefore the hydrolysis speed depends in particular on the type of alkoxy groups in silicon position or titanium, zirconium or aluminum position. The methoxy group hydrolyzes the most rapidly and a deceleration occurs with increasing chain length of the hydrocarbon group. In addition, the duration of the entire hydrolysis and polycondensation process also depends on the basicity of the aminoorganosilane. Amines function, as is known, as condensation accelerators by inducing an autocatalysis. Hydrolysis and polycondensation can therefore be accelerated by the addition of bases, preferably of ammonia or of inorganic or organic acids, but also of customary condensation catalysts such as dibutyl tin diacetate.

The requirement of maintaining the initial material dissolved in solvent and compounded with water at a certain temperature under further agitation therefore results in the fact that the speed of the polycondensation, which displays itself by gelling, is temperature-dependent.

The temperature to be used in the hydrolysis or gelling phase is determined empirically in the individual instance. Care is taken thereby that a jelly-like mass free of solids and permeated with liquid remains preserved for the following next method step, the so-called forming phase.

The forming phase occurring with the conversion of the coherent, liquid-permeated, jelly-like mass (in which the condensation reaction proceeds further) into separate spherical particles begins with the compounding of the reaction mixture, which has gelled or started to gel, with a solvent in the provided amount which is largely water-insoluble but dissolves the reaction mixture to a sufficient extent.

Suitable solvents are e.g. linear or branched alcohols with 4 to 18 C atoms or phenol, linear or branched symmetric or asymmetric dialkyl ethers as well as di- or triethers (such as ethylene glycol dimethylether), chlorinated or fluorinated hydrocarbons, aromatics or aromatic mixtures substituted with one or more alkoxy groups such as e.g. toluene or xylene, symmetric or asymmetric ketones which are largely not miscible with water.

Preferably, however, a linear or branched alcohol with 4 to 12 C atoms, toluene or o-, m-, p- xylene is added individually or in a mixture to the reaction mixture which has gelled or started to gel.

This addition of solvent brings about a dilution after the homogenization with the reaction mixture and therewith a distinct deceleration of the condensation reaction occurring with the increase in viscosity.

The measuring of the amount of this solvent used in the forming phase depends in particular on what particle size is being striven for the formed organosiloxane amine compound. The following can be used as a rule of thumb: Little solvent should be used for coarse particles (spheres with a rather large diameter) and a lot of solvent for fine particles (spheres with a rather small diameter).

Moreover, the intensity with which the viscous homogenizate consisting of reaction mixture and largely water-insoluble solvent is dispersed in the additional water added in the forming phase as dispersing agent also influences the particle. Vigorous agitation regularly favors the formation of a rather fine particle. In order to stabilize the aqueous dispersion of the organic phase (not containing siloxane), one of the known auxiliary dispersing agents such as long-chain carboxylic acids or their salts or polyalkylene glycols can be used in customary concentrations.

According to a variant of the method of the invention, a part or also the entire amount of the largely water-insoluble solvent to be added during or after the start of gelling is added in the hydrolysis stage along with the solvent used there. In the case of partial addition, the remainder is added after the start of gelling.

In the extreme case of the addition of the entire amount, the dispersing agent, water, can be added during or after the start of gelling. This variant is used with preference if the added organosilane mixture and optional cross-linking agent mixture added exhibits an extremely high tendency toward hydrolysis and polycondensation.

The preferred temperature at which the dispersing of the siloxane-containing organic phase in the aqueous phase is carried out and spherical solid is formed from the dispersed phase is as a rule the reflux temperature of the entire mixture. However, the same temperatures as in the gelling stage can basically be used. The total duration of dispersing stage and postreaction is as a rule 0.5 to 10 hours.

Both the gelling and the forming can be carried out at normal pressure or at a superpressure corresponding to the sum of the partial pressures of the components of the reaction mixture at the particular temperature used.

The case can occur in the production of the formed, cross-linked or non-cross-linked organosiloxane amines of the invention, which is also a function of the type of alkoxy groups, that one or more components of the mixture to be gelled exhibit a different hydrolysis behavior and polycondensation behavior. In this case, a development of the method of the invention provides that the cross-linking agent or agents VIII and/or the functional organosilane VI are not subjected to the gelling together with the aminoorganosilane V but rather the aminoorganosilane, optionally together with the cross-linking agent VIII or the organosilane VI, is first gelled separately, homogenized with the largely water-insoluble solvent and only then is the cross-linking agent or agents or the organosilane added to the homogenizate.

However, the solvent and the still-lacking silane component can also be added to the gelled aminoorganosilane and optional cross-linking agent or organosilane at the same time.

The separation of the spherically formed, moist product from the liquid dispersing agent can take place by means of customary measures such as decanting, filtering off or centrifuging.

To this end, however, the liquid phase can also be removed from the reactor and the solid remaining therein treated once or several times with a low-boiling extraction agent, preferably a low-boiling alcohol, in order to render easier the later drying of the formed material by means of an at least partial exchange of the usually relatively high-boiling solvent of the forming phase with the low-boiling extraction agent.

The drying can basically be carried out at room temperature to 250° C., optionally under protective gas or in a vacuum. The dried, formed solid can be tempered at temperatures of 150° to 300° C. for hardening and stabilizing.

The dried and/or tempered product can be classified according to particle size in customary devices into different particle size fractions. The one or the other of the workup measures of extraction, drying, tempering and classifying can be eliminated, as desired. A classification according to size can be carried out with liquid-moist, dried or tempered product using conventional techniques.

In order to compensate for a different hydrolysis behavior and polycondensation behavior of the monomeric components of a random, optionally cross-linked copolycondensate, according to a production variant of the invention, the monomeric components according to formulas V and VI and the optionally present cross-linking agent or agents according to formula VIII can be initially precondensed. To this end, the aminosilane according to formula V, the monomeric component according to formula VI and the cross-linking agent or agents according to formula VIII are precondensed without solvent or by using a solvent which dissolves the monomeric component, preferably using an alcohol with 1 to 5 C atoms corresponding to the alkoxy groups, in the presence of an amount of water not sufficient for total hydrolysis, preferably from 1 to 100 mole % of the amount required for this, over a time period of 5 minutes up to 48 hours at room temperature to 200° C. In order to favor this precondensation effect, yet another condensation catalyst such as e.g. an inorganic or organic acid or base or a metal-containing condensation catalyst such as e.g. dibutyl tin diacetate can be added in addition to the aminoorganosilane present. Ammonia is used with preference in this aspect of the invention. After complete precondensation, the entire hydrolysis and polycondensation are carried out as described above.

According to another method variant of the invention, so-called block copolycondensates are obtained in which there is a formation of blocks of identical units according to formulas I and II and optionally of one or more units according to formula IV.

The precondensation to be carried out thereby can likewise be accelerated by the addition of a slight amount of an acidic or base condensation catalyst or also of a metal-containing condensation catalyst. Ammonia is preferably used in this variation of the invention. The amount of water used for precondensation depends on which degree of oligomerization, that is, which block size, is to be achieved. If more water is used for the precondensation, naturally, larger units are produced than if less water is used. The duration of precondensation generally depends, as already described above, on the readiness to hydrolyze of the monomeric component and of the temperature.

According to a further method variant of the invention, so-called mixed copolycondensates are obtained in which there is in part a formation of blocks of identical units according to formula I and/or formula II and/or of one or more units according to formula IV in which, however, at least one monomeric component is always not precondensed and at least one monomeric component is precondensed. This variation provides that from the provided monomers of the general formulas V, VI and optionally VIII, at least one monomer or several monomers are precondensed independently of each other, as described above. Subsequently they are united with the remaining, non-precondensed monomer or monomers. Thereafter, with the addition of more water as well as, optionally, more solvent, the complete hydrolysis and polycondensation of the entire mixture is completed. The subsequent treatment of the polycondensate formed thereby follows in accordance with the other methods described.

An especially important embodiment of the method of the invention provides that spherical material which is still moist or wet with solvent and with water is subjected to a temperature treatment for 1 hour to one week at temperatures from 50° to 300° C., preferably 100° to 200° C., whereby excess pressure is used as needed.

This treatment under "steaming" or digesting conditions likewise serves primarily for an improvement of the mechanical strength and of the porosity of the formed material. This treatment can also be carried out at the end of the production method in the dispersion which is present and contains a liquid product phase and the solid product phase or can be carried out in water alone.

The above-described embodiment of a posttreatment of the not yet dried, formed organosiloxane copolycondensates is carried out by subjecting the solid shaped in the form of spheres is subjected to a temperature treatment in the presence of at least the component water or of the liquid phase present at the end in the production method as vapor or liquid. The treatment is heating for 1 hour up to one week at temperatures of 50° to 300° C., preferably 100° to 200° C., optionally under excess pressure. The presence of an acidic, basic or metal-containing catalyst can be advantageous thereby. An especially advantageous embodiment provides for the use of ammonia.

The new, formed organosiloxane amine copolycondensates are characterized in particular by the quantitative hydrolysis yields, the elementary analyses and by the determination of the individual functionalities. Purely optically speaking, there is no difference between the copolycondensates obtained in accordance with the different production methods. Depending on the pretreatment, the spherically formed copolycondensates of the invention exhibit a particle diameter of 0.01 to 3.0 mm, preferably 0.05 to 2.0 mm, a specific surface of up to 1000 m²/g, preferably up to 700 m²/g, a specific pore volume of up to 6.0 ml/g and a bulk density of 50 to 1000 g/l, preferably 100 to 800 g/l. The adjustable pore diameters are in a range of 0 to over 1000 nm.

The chemical stability of the formed products is comparable to those of the unformed products, that is, they are distinctly above 150° C. in air and above 200° C. under an atmosphere of protective gas, depending on the individual functionalities.

In addition to the general applicability of the formed copolycondensates as active-substance carriers in the broadest sense, further subject matter of the invention is constituted by the use of copolycondensates in which X stands for the complexing groups >N—H, —S—, —S$_2$—, —S$_3$—, —S$_4$—,

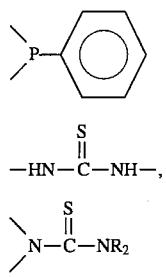

for removing dissolved metals from a liquid aqueous or organic phase according to the static or dynamic principle.

One use of all copolycondensates of the invention is their application for the adsorptive binding of gaseous organic compounds and/or of water vapor, preferably of organic solvents. The liquid or vapor desired to be treated in accordance with this aspect of the invention and contacted with the copolycondensate as described.

Decisive factors for this absorption activity are in particular the specific pore volume, the pore diameter and the surface properties.

These factors can be influenced on the one hand via the production and posttreatment methods of the invention and on the other hand also via the chemical composition, e.g. by means of the insertion of groups of cross-linking agents with hydrophobing action into the polysiloxane skeleton. The recovery of the adsorbed organic compounds or of the water is readily possible by means of elevating the temperature and/or by gassing with heated air.

DETAILED EMBODIMENTS OF INVENTION

The invention is explained further in the following examples of embodiments.

Example 1

385.8 g (0.906 mole) NH[(CH$_2$)$_3$Si(OC$_2$H$_5$)$_3$]$_2$ and 114.2 (0.18 mole) N[(CH$_2$)$_3$Si(OC$_2$H$_5$)$_3$]$_3$ were combined in 500 ml ethanol. The mixture was heated in a 3-liter reactor with double jacket to 70° C. and compounded with 500 ml octanol-1 at first and then with 150 ml desalinated water. The mixture was then cooled down under agitation (200 rpms) to 40° C. and agitated further at this temperature until the start of gelling. After the start of gelling, another 300 ml octanol and 800 ml desalinated water in which 2.5 g polyethylene glycol were dissolved were added and the speed of rotation of the anchor agitator used raised to 500 rpms. The mixture was subsequently agitated 3 h under reflux, then cooled down, extracted with a total of 1 liter ethanol and then dried only 4 h at 90° C., 4 h at 110° C. and 16 h at 130° C. in a current of nitrogen.

A total of 237.5 g (99.8% of theory) formed organosiloxane amine copolycondensate were obtained consisting of polymer units of the formula

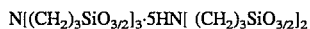

N[(CH$_2$)$_3$SiO$_{3/2}$]$_3$·5HN[ (CH$_2$)$_3$SiO$_{3/2}$]$_2$ of which 97% exhibited a particle size of 0.1 to 1.6 mm.
Specific surface: 485 m²/g
Total specific pore volume: 2.2 ml/g
Bulk density: 346 g/l

Example 2

76.9 g (0.18 mole) $(C_6H_5)P[(CH_2)_3Si(OCH_3)_3]_2$, 223.1 g (0.35 mole) $N[(CH_2)_3Si(OC_2H_5)_3]_3$ and 73.8 g (0.35 mole) $Si(OC_2H_5)_4$ were combined in 350 ml ethanol. The mixture was heated in a 3-liter reaction vessel with KPG agitator with a crescent-shaped agitator blade, reflux condenser and inner thermometer to 75° C. The clear solution was compounded with 130 ml desalinated water at a temperature of 90° C., then agitated 15 min. under reflux and then cooled down to 70° C. The clear, viscous solution was maintained at this temperature under slow agitation (250 rpms) until the start of gelling. Approximately 1 min. after the start of gelling, 600 ml toluene were added and after the completion of homogenization 700 ml warm, desalinated water at a temperature of 50° C. were added. Subsequently, the mixture was agitated 2 h at 700 rpms at reflux temperature, then cooled down and then the entire reaction mixture was transferred into a steel autoclave and slowly agitated 24 h at 150° C. under inherent pressure.

The mixture was subsequently cooled off and the formed solid filtered off from the liquid phase. After a 6-hour drying at 90° C. and a 12-hour drying at 130° C. under an atmosphere of $N_2$, 178 g (99.6% of theory) symmetric, spherical product were obtained consisting of polymer units of the formula

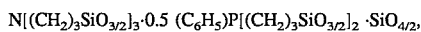

$N[(CH_2)_3SiO_{3/2}]_3 \cdot 0.5\ (C_6H_5)P[(CH_2)_3SiO_{3/2}]_2 \cdot SiO_{4/2}$, of which 97 exhibited a particle size of 0.2–1.5 mm.
Specific surface: 456 m²/g
Total specific pore volume: 2.6 ml/g
Bulk density: 423 g/l

Example 3

912.1 g (2.06 moles) $S[(CH_2)_3Si(OC_2H_5)_3]_2$ were compounded with 500 ml ethanol and heated in a 10-liter quickfit apparatus with agitator, reflux condenser and inner thermometer to reflux temperature. After reflux temperature had been achieved, 50 ml desalinated water were added to the solution. The mixture was agitated 1 hour at first under reflux. Then, 260.0 g (0.41 mole) $N[(CH_2)_3Si(OC_2H_5)_3]_3$, 429.2 g (2.06 moles) $Si(OC_2H_5)_4$ and 1200 ml ethanol as well as another 450 ml water were added. The mixture was agitated further for 25 min. under reflux, then cooled down to 76° C. and slowly agitated further until the start of gelling. After the start of gelling, 2500 ml hexanol-1 were added and after another 10 min 3.0 liters desalinated water in which 7.5 g polyvinyl alcohol had been dissolved were added. The mixture was agitated 1 hour further under reflux, then the formed solid was filtered off. This solid was compounded with 3.0 liters 2% solution of $NH_3$, then transferred into a steel autoclave and agitated 48 h at 130° C. Then, the mixture was cooled off, the solid filtered off, washed with a total of 5.0 liters ethanol and then dried 6 h at 80° C. and 18 h at 130° C. under an atmosphere of $N_2$ protective gas. A total of 692 g (99% of theory) of a mixed copolycondensate was obtained consisting of units of the formula

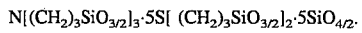

$N[(CH_2)_3SiO_{3/2}]_3 \cdot 5S[(CH_2)_3SiO_{3/2}]_2 \cdot 5SiO_{4/2}$.

Over 96% of the spherical product was present in a particle size of 0.3 to 1.8 min.
Specific surface: 636 m²/g
Total specific pore volume: 3.2 ml/g
Bulk density: 366 g/l

Example 4

280.1 g (0.66 mole) $HN[(CH_2)_3Si(OC_2H_5)_3]_2$, 82.9 g (0.13 mole) $N[(CH_2)_3Si(OC_2H_5)_3]_3$, 137.1 g (0.66 mole) $Si(OC_2H_5)_4$ and 195.7 g (1.32 mole) $(CH_3)_2Si(OC_2H_5)_2$ were combined in 700 ml ethanol. The mixture was heated to reflux temperature in a 6-liter glass container with agitator, reflux cooler and drop funnel and then compounded with 200 ml water.

The solution was cooled at once to 50° C. and maintained at this temperature until the start of gelling. After the start of gelling, 1400 ml octanol-1 were added and then 1500 ml desalinated water in which 2.5 g polyvinyl alcohol had been dissolved. After further workup and posttreatment in an analogous manner with example 3, 306 g (98.5% of theory) polymeric product were obtained consisting of polymer units of the formula

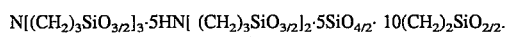

$N[(CH_2)_3SiO_{3/2}]_3 \cdot 5HN[(CH_2)_3SiO_{3/2}]_2 \cdot 5SiO_{4/2} \cdot 10(CH_2)_2SiO_{2/2}$.

95% of the spherical product exhibited a particle size of 0.3 to 1.6 mm after classification had been performed.
Specific surface: 436 m²/g
Total specific pore volume: 1.6 ml/g
Bulk density: 476 g/l

Example 5

78.8 g (0.125 mole) $N[(CH_2)_3Si(OC_2H_5)_3]_3$ were compounded with 5 ml desalinated water and agitated 1 h at 80° C. Parallel thereto, 121.2 g (0.25 mole) of the thiourea derivative

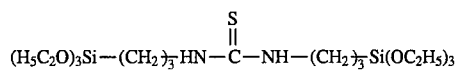

$(H_5C_2O)_3Si-(CH_2)_3-HN-\underset{\underset{S}{\|}}{C}-NH-(CH_2)_3-Si(OC_2H_5)_3$ were precondensed, likewise after the addition of 5 ml water, over a period of 1 h at 80° C.

Both precondensates were combined after this time in 200 ml ethanol and agitated after the addition of 50 ml more water 10 min. under reflux, then cooled down to 70° C. and agitated further (200 rpms) until the start of gelling. 30 sec. after the start of gelling, 300 ml octanol-1 were added and 5 min. later 300 ml desalinated water. The reaction mixture was agitated 2 h more at 600 rpms, then cooled off, the spherical solid filtered off from the liquid phase, aged analogously with example 3 in an autoclave and then extracted. After 8 hours of drying at 90° C. and 16 hours of drying at 140° C. under an atmosphere of protective gas, 102 g of a block copolycondensate were obtained consisting of units of the formula

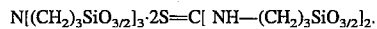

$N[(CH_2)_3SiO_{3/2}]_3 \cdot 2S=C[NH-(CH_2)_3SiO_{3/2}]_2$.

94% of the formed product exhibited a particle size of 0.2 to 1.6 mm.
Specific surface: 456 m²/g
Total specific pore volume: 2.2 ml/g
Bulk density: 446 g/l

Example 6

78.8 g (0.125 mole) $N[(CH_2)_3Si(OC_2H_5)_3]_3$ and 121.2 g (0.25 mole)

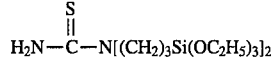

$H_2N-\underset{\underset{S}{\|}}{C}-N[(CH_2)_3Si(OC_2H_5)_3]_2$ were combined, compounded with 5 ml desalinated water and agitated for 6 h at first at 70° C. Subsequently, 200 ml ethanol and 30 ml more water were added and agitated 5 min. under reflux. The mixture was then cooled down to 70° C. and agitated further until the start of gelling. After the start of gelling, 600 ml decanol were added and shortly thereafter 400 ml water. The mixture was agitated 1 h at 600 rpms (crescent-shaped agitator) and the process continued analogously with example 3. After drying and classifying, 100.5 g of an organosiloxane amine copolycondensate were obtained consisting of units of the formula

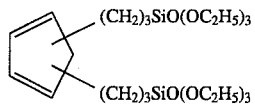

Over 97% of the spherical product was present in a particle size of 0.2 to 1.2 min.
Specific surface: 496 m²/g
Total pore volume: 2.2 ml
Bulk density: 486 g/l Example 7

78.8 g (0.125 mole) N[(CH$_2$)$_3$Si(OC$_2$H$_5$)$_3$]$_3$ and 118.7 g (0.25 mole) of an isomeric mixture with the formula

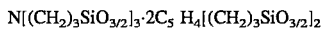

were reacted analogously to example 6 using diisopropyl ether instead of decanol and without the thermal posttreatment in an autoclave. 98.0 g of a copolycondensate consisting of units of the formula N[(CH$_2$)$_3$SiO$_{3/2}$]$_3$·2C$_5$H$_4$[(CH$_2$)$_3$SiO$_{3/2}$]$_2$ were obtained, 98% of which was present in a particle size of 0.3 to 1.8 mm.
Specific surface: 56 m²/g
Total specific pore volume: 0.5 ml/g
Bulk density: 610 g/l Example 8

1007.6 g (2.0 mole) N[(CH$_2$)$_3$Si(OCH$_3$)$_3$]$_3$ were dissolved in 500 ml ethanol. The solution was compounded with 30 ml water and agitated 1 h under reflux. Subsequently, 769.2 g (2.0 moles)

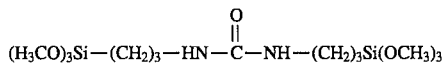

528.9 g (2.0 moles) Si(OC$_3$H$_7$)$_4$ and 700 ml water were added and agitated 5 min. again under reflux. The mixture was then cooled down to 60° C. and slowly agitated further until the start of gelling. Immediately after the start of gelling, 2.8 liters 2-ethyl hexanol and then 2.5 liters water were added. After the method proceeded further in analogy with example 3, but after ageing in 1n HCl and after neutralization with NH$_3$, 1190 g polymeric, formed product were obtained consisting of units of the formula N[(CH$_2$)$_3$SiO$_{3/2}$]$_3$·O=C[ NH—(CH$_2$)$_3$—SiO$_{3/2}$]$_2$·SiO$_2$.

95% of the formed material was present in a particle size of 0.1 to 1.2 mm.
Specific surface: 466 m²/g
Total specific pore volume: 1.8 ml/g
Bulk density: 490 g/l Example 9

50.4 g (0.1 mole) N[(CH$_2$)$_3$Si(OCH$_3$)$_3$]$_3$ and 107.6 g (0.2 mole) HN[(CH$_2$)$_{10}$Si(OCH$_3$)$_3$]$_2$ were combined and precondensed after the addition of 5 ml water 24 h at 60° C. under agitation. The precondensate was subsequently compounded with 200 ml isopropanol and 40 ml more water. The solution was subsequently agitated further under reflux until the start of gelling. After the start of gelling, 300 ml octanol were added and after a further 30 min. 300 ml water were added. This suspension was agitated 3 h under reflux, then the solid was filtered off from the liquid phase and washed with a total of 1 liter isopropanol. After 8 hours of drying at 100 ° C., 8 hours of drying at 130° C. and 16 hours of tempering at 160° C. under an atmosphere of N$_2$, 106.0 g polymeric product were obtained consisting of polymer units of the formula N[(CH$_2$)$_3$SiO$_{3/2}$]$_3$·2HN[ (CH$_2$)$_{10}$SiO$_{3/2}$]$_2$.

95% of the formed product was present in a particle size of 0.3 to2.4mm.
Specific surface: approx. 1 m²/g
Bulk density: 752 g/l Example 10

644.1 g (1.0 mole)

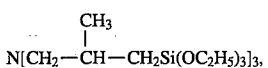

61.3 g (0.1 mole)

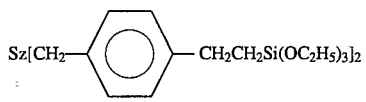

and 24.6 g (0.1 mole) Al(OC$_4$H$_9$)$_3$ were compounded with 2 ml 1n aqueous solution of HCl and agitated 24 h at 80° C. Subsequently, 700 ml ethanol and 200 ml water were added and the mixture agitated again for 10 min. under reflux.
After the method proceeded analogously to example 3, using xylene (industrial mixture) instead of octanol, 345 polymeric product were obtained consisting of polymer units of the formula

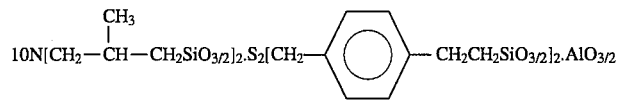

98% of the formed product was present in a particle size of 0.3 to 2.2 mm.
Specific surface: 398 m²/g
Total specific pore volume: 1.6 ml/g
Bulk density: 486 g/l

Example 11

71.4 g (0.1 mole) N[(CH$_2$)$_5$—Si(OC$_2$H$_5$)$_3$]$_3$, 42.9 g (0.1 mole) S=C[NH—CH$_2$—Si(OC$_2$H$_5$)$_3$]$_2$, 21.2 g (0.1 mole) (C$_2$H$_5$)Ti(OC$_2$H$_5$)$_3$ and 208.3 g (1.0 mole) Si(OC$_2$H$_5$)$_4$ were precondensed analogously to example 10 and treated further analogously to example 3. 125 g polymeric product were obtained consisting of polymer units of the formula

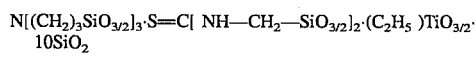
N[(CH$_2$)$_3$SiO$_{3/2}$]$_3$·S=C[ NH—CH$_2$—SiO$_{3/2}$]$_2$·(C$_2$H$_5$)TiO$_{3/2}$·10SiO$_2$ whereby 99% was present in a particle size of 0.2 to 2.4 mm.
Specific surface: 296 m²/g

Example 12

126.0 g (0.2 mole) N[(CH$_2$)$_3$Si(OC$_2$H$_5$)$_3$]$_3$ and 111.2 g (0.2 mole) of a dimethylaminoethyl-substituted thiourea of the formula

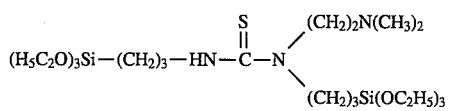

were dissolved in 250 ml ethanol and compounded with 80 ml desalinated water. The clear solution was heated to reflux temperature, agitated 10 min. under reflux and then cooled down to 70° C. The solution was agitated further at this temperature at 300 rpms until the start of gelling. After the start of gelling, 500 ml octanol were added at first and then 600 ml water. The mixture was agitated 2 h further under reflux, then cooled down and the filtered-off solid compounded with 500 ml 2% aqueous solution of NH$_3$ and treated further as in example 3, worked up and dried. 125.0 g polymeric product were obtained consisting of polymer units of the formula

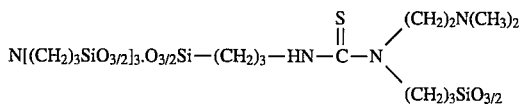

whereby 98% of the formed product was present in a particle size of 0.3 to 1.8 mm.
Specific surface: 526 m²/g
Total specific pore volume: 1.86 ml/g
Bulk density: 416 g/l

Example 13

Starting with 126.0 g (0.2 mole) N[(CH$_2$)$_3$Si(OC$_2$H$_5$)$_3$]$_3$ and 111.2 g (0.2 mole) of a dimethylaminoethyl-substituted thiourea with the formula

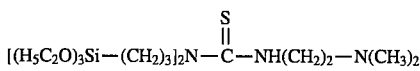

125.3 g polymeric product were obtained analogously with example 12 and consisting of polymer units with the formula

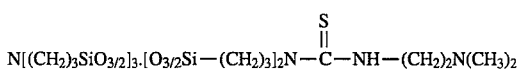
N[(CH$_2$)$_3$SiO$_{3/2}$]$_3$·[O$_{3/2}$Si—(CH$_2$)$_3$]$_2$N—C(=S)—NH—(CH$_2$)$_2$N(CH$_3$)$_2$ 97% of the formed product was present in a particle size of 0.3 to 1.8 mm.
Specific surface: 496 m²/g
Total specific pore volume: 1.93 ml/g
Bulk density: 401 g/l

Example 14

Starting with 630.1 g (1.0 mole) N[(CH$_2$)$_3$Si(OC$_2$H$_5$)$_3$]$_3$, 44.3 g (0.1 mole) S[(CH$_2$)$_3$Si(OC$_2$H$_5$)$_3$]$_2$ and 19.2 g (0.05 mole) Zr(OC$_4$H$_9$)$_4$, 320.0 g polymeric product were obtained in analogously with example 10 and consisting of polymer units with the formula

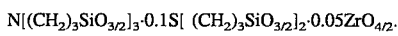
N[(CH$_2$)$_3$SiO$_{3/2}$]$_3$·0.1S[ (CH$_2$)$_3$SiO$_{3/2}$]$_2$·0.05ZrO$_{4/2}$.

95% of the formed product was present in a particle size of 0.2 to 2.4 mm.
Specific surface: 426 m²/g
Total specific pore volume: 1.75 ml/g
Bulk density: 452 g/l

Example 15

5 g of the formed organopolysiloxane copolycondensate produced according to example 1 with a particle size of 0.1–0.2 mm were suspended in 100 ml water in which 50 mg Cu(I) were dissolved. The suspension was agitated 3 h at 90° C. and the solid then filtered off from the liquid phase and rewashed with 50 ml H$_2$O. An analysis of the liquid phase showed a dissolved residual amount of Cu(I) of a total of 2 mg, that is, 96% of the Cu(I) had been bonded.

Example 16

50 ml of the copolycondensate containing sulfane groups with a particle size of 0.3 to 1.8 mm produced in example 3 were slurried in water and then transferred into a glass column with an inner diameter of 20 mm. The column was loaded within 1 hour with 200 ml water in which 10 mg mercury were dissolved as Hg(NO$_3$)$_2$. After a rewashing with 50 ml water, an analysis of the liquid which passed through was carried out which showed a residual mercury content of 5 μg.

Example 17

5 g of the copolycondensate produced in example 2 with a particle size of 0.2–0.3 mm were suspended in 50 ml water in which 3 mg palladium were dissolved as PdCl$_2$. The suspension was agitated 3 h at room temperature, then the solid was filtered off and washed with 30 ml water. An analysis showed a residual Pd content of 50 μg.

Example 18

50 ml of an ethanolic solution in which 5 mg platinum were dissolved as Na$_2$PtCl$_4$ were treated over a time period of 3 h at reflux temperature analogously to example 17 with 5 g of the copolycondensate prepared in example 5 with a grain size of 0.2–0.3 mm. An analysis showed a residual amount of 0.1 mg platinum.

Example 19

A test analogous to example 18 using 5 g of the polysiloxane prepared in example 12 and using rhodium (dissolved as RhCl$_3$·3H$_2$O) instead of platinum resulted in a residual amount of 0.1 mg rhodium.

Example 20

5 g of the copolycondensate prepared in example 1 were placed in a wash bottle. The wash bottle was thermostatted in a cupboard to 20° C. and loaded with a current of air of 100 ml/h which was charged with m-xylene at 90% of the saturation value. The absorption of m-xylene was monitored by means of a regular checking of the increase in weight of the polymer. A weight increase of 65% was determined in the equilibrium state.

Example 21

5 g of the copolycondensate prepared in example 3 were placed in a wash bottle. The wash bottle was thermostatted in a cupboard to 20° C. and loaded with a current of air analogously with example 20 which was charged at 90% with 1.1.1-trichloroethane. A weight increase of 95% was determined in the equilibrium state.

Example 22

A method analogous to that in example 20 using isopropanol and the polysiloxane prepared in example 8 yielded a weight increase of 58%.

Further variations and modifications of the foregoing will be apparent to those skilled in the art and are intended to be encompassed by the claims appended hereto.

German priority application P 39 25 359.7 is relied on and incorporated herein.

We claim:

1. Macroscopic spherical particles comprising organosiloxane copolycondensate consisting of units of the formula

and of units of the formula

wherein R$^1$ to R$^5$ are identical or different and signify a group of the general formula

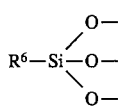

wherein R$^6$ is bound directly to the nitrogen atom or the double-bonded X group and represents a linear or branched alkylene group with 1 to 10 C atoms, a cycloalkylene group with to 8 C atoms or a unit of the general formula

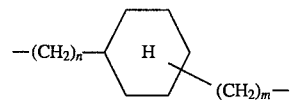

or

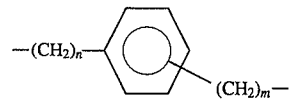

in which n is a number from 1 to 6 and indicates the number of methylene groups bound to nitrogen or in the X position and m is a number from 0 to 6, wherein the free valences of the oxygen atoms bound to the silicon atom are saturated as in silica skeletons by silicon atoms of further groups of formula (III) and/or via the metal atoms in one or more of the cross-linking bridge-type cross-links

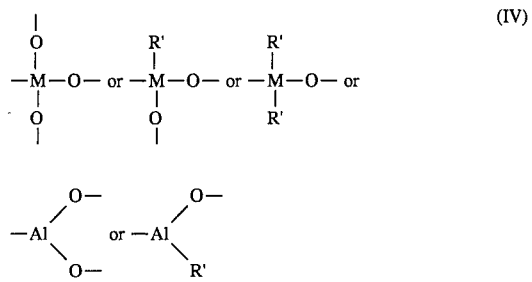

M is a silicon, titanium or zirconium atom and R' is a linear or branched alkyl group with 1 to 5 C atoms or a phenyl group and the ratio of silicon atoms from the groups of the formula (III) to the metal atoms in the bridge-type cross-links (IV) is 1:0 to 1:20 and
X=>N—H, >N—CH$_3$, >N—C$_2$H$_5$, —S—, —S$_2$—, —S$_3$—, —S$_4$—,

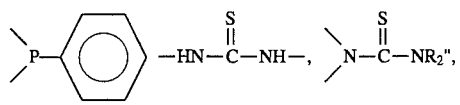

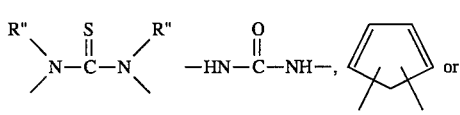

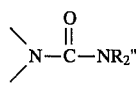

wherein R" is H or is a linear or branched alkyl group with 1 to 5 C atoms or a group (CH$_2$)$_n$—NR$_2$''',
wherein n signifies a number from 1 to 6 and R''' is H or is a linear or branched alkyl group with 1 to 5 C atoms, said particles having a diameter of 0.01 to 3.0 mm, a specific surface of up to 1000 m$^2$/g, a specific pore volume of up to 6.0 ml/g as well as a bulk density of 50 to 1000 g/l.

2. The organosiloxane copolycondensate according to claim 1, characterized in that the ratio of units according to formula (I) to units according to formula (III) is from 0.03:99.97 to 99.99:0.01.

3. The organosiloxane copolycondensate according to claim 1, characterized in that they are random copolycondensate, block copolycondensate or mixed copolycondensates.

4. The organosiloxane copolycondensate according to claim 1, characterized in that $R^1$ to $R^5$ stand for a group of the formula

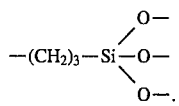

5. The organosiloxane copolycondensate according to claim 1 wherein the particles have a diameter of 0.05 to 2.0 mm, a specific pore value of up to 700 m2/g and a bulk density of 100 to 800 g/l.

6. The organosiloxane copolycondensate according to claim 2, wherein the ratio is 5:95 to 95:5.

7. A method for the preparation of macroscopic spherical particles of random organosiloxane amine copolycondensate comprising dissolving in a solvent a tertiary aminoorganosilane of the formula

 (V)

together with an organofunctional silane

 (VI)

corresponding to the desired stoichiometric composition of the copolycondensate to be prepared, wherein $R^7$ to $R^{11}$ are identical or different and signify a group of the formula

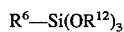 (VII)

$R^6$ represents a linear or branched alkylene group with 1 to 10 C atoms, a cycloalkylene group with 5 to 8 C atoms or a unit of the formula

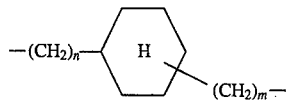

or

in which n is a number from 1 to 6 and indicates the number methylene groups bound to nitrogen or in the X position and m is a number from 0 to 6, $R^{12}$ signifies a linear or branched alkyl group with 1 to 5 C atoms and $X = >N-H$, $>N-CH_3$, $>N-C_2H_5$, $-S-$, $-S_2-$, $-S_3-$, $-S_4-$,

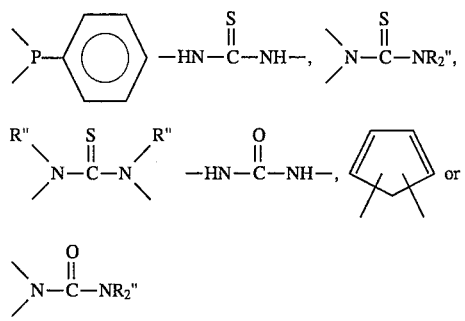

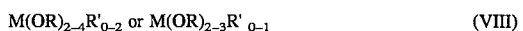

wherein R" is H or is a linear or branched alkyl group with 1 to 5 C atoms or a group $(CH_2)_n-NR_2'$''', wherein n signifies a number from 1 to 6 and R''' is H or is a linear or branched alkyl group with 1 to 5 C atoms, optionally after the addition of one or more cross-linking agents of the general formula $$M(OR)_{2-4}R'_{0-2} \text{ or } M(OR)_{2-3}R'_{0-1} \qquad (VIII)$$

whereby M is a silicon, titanium, zirconium or aluminum atom, R' a linear or branched alkyl group with 1 to 5 C atoms or a phenyl group and R signifies a linear or branched alkyl group with 1 to 5 C atoms and the ratio of silicon atoms from the groups of the general formula (VII) to the metal atoms in the cross-linking agents (VIII) is 1:0 to 1:20, said solvent being largely water-miscible but capable of dissolving aminoorganosilanes according to formula (V) and organofunctional silanes according to formula (VI) as well as cross-linking agents according to formula (VIII), adding an amount of water to the resulting solution under agitation which amount is at least sufficient for the complete hydrolysis and condensation of silanes to form a reaction mixture, allowing the reaction mixture to gel under further agitation at a certain temperature in a range from room temperature to 200° C., compounding the reaction mixture at the start of gelling or up to one hour thereafter with 10 to 2000%, by weight, of a solvent which is largely water-insoluble but which dissolves the reaction mixture which has gelled or started to gel, homogenizing said gel and adding 10 to 2000%, by weight water, said weights being relative to the total amount of aminoorganosilane (V), organofunctional silane (VI) and, optionally, cross-linking agents (VIII), to the viscous homogenizate formed thereby immediately or within a time frame of up to 3 hours, optionally under elevation of the originally set temperature of from room temperature to 200° C.;

dispersing the organic phase formed thereby, which now contains siloxane, in the liquid two-phase system formed thereby, separating the solid forming in the form of spheres from the liquid phase after a time sufficient for this purpose at a temperature ranging from room temperature to 200° C.

8. The method according to claim 7 wherein the amount of said largely water insoluble solvent is 50 to 500% by weight and the amount of said water subsequently added is 50 to 500% by weight.

9. The method according to claim 7, wherein that methanol, ethanol, n- and i-propanol, n- and i-butanol or n-pentanol, alone or in mixture, is used as solvent in the hydrolysis.

10. The method according to claim 7, wherein the hydrolysis is carried out with an excess of water.

11. The method according to claim 7, wherein a linear or branched alcohol with 4 to 12 C atoms, toluene or o-, m-, p-xylene is added individually or in a mixture to the reaction mixture which has gelled or started to gel.

12. The method according to claim 7, wherein at or after the start of gelling the entire amount of the solvent which is largely water-insoluble is added in the hydrolysis stage in addition to the solvent used.

13. The method according to claim 7, wherein gelling and forming of said solid spheres are carried out at normal pressure or at an excess pressure corresponding to the sum of the partial pressures of the components of the reaction mixture at the particular temperature used.

14. The method of posttreating the formed organosiloxane copolycondensates obtained according to claim 7, wherein undried solid formed in the form of spheres is subjected in the presence of at least the component water in 15. The method according to claim 14, wherein the posttreatment is carried out in the presence of an acidic, basic or metal-containing catalyst. the liquid phase to a temperature treatment for 1 hour to one week at 50° C. to 300° C., optionally with excess pressure.

16. The method according to claim 7, further comprising extracting, drying at room temperature to 250° C. optionally under protective gas or in a vacuum, and tempering from 1 to 100 hours at temperatures from 150° C. to 300° C. and/or classifying by size.

17. The method according to claim 7, comprising adding 10 to 500% by weight of water to said viscous homogenizate.

18. The method according to claim 7, comprising adding 27.4 to 215% by weight of water to said viscous homogenizate.

19. A method for the preparation of macroscopic spherical particles of random organosiloxane amine copolycondensate comprising (a) dissolving in a solvent a tertiary aminoorganosilane of the formula

optionally with an organofunctional silane

corresponding to the desired stoichiometric composition of the copolycondensate to be prepared, wherein $R^7$ to $R^{11}$ are identical or different and signify a group of the formula

$R^6$ represents a linear or branched alkylene group with 1 to 10 C atoms, a cycloalkylene group with 5 to 8 C atoms or a unit of the formula

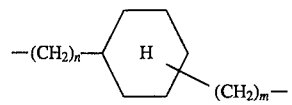

or

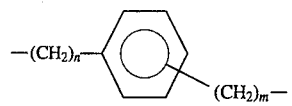

which n is a number from 1 to 6 and indicates the number of methylene groups bound to nitrogen or in the X position and m is a number from 0 to 6, $R^{12}$ signifies a linear or branched alkyl group with 1 to 5 C atoms and $X = {>}N{-}H$, ${>}N{-}CH_3$, ${>}N{-}C_2H_5$, $-S-$, $-S_2-$, $-S_3-$, $-S_4-$,

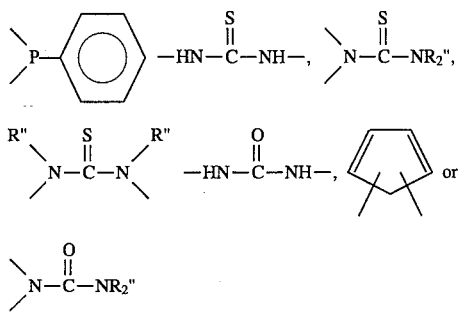

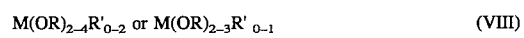

wherein R" is H or is a linear or branched alkyl group with 1 to 5 C atoms or a group $(CH_2)_n-NR_2'$", wherein n signifies a number from 1 to 6 and R''' is H or is a linear or branched alkyl group with 1 to 5 C atoms, and optionally with one or more cross-linking agents of the general formula $$M(OR)_{2-4}R'_{0-2} \text{ or } M(OR)_{2-3}R'_{0-1} \quad \text{(VIII)}$$

whereby M is a silicon, titanium, zirconium or aluminum atom, R' a linear or branched alkyl group with 1 to 5 C atoms or a phenyl group and R signifies a linear or branched alkyl group with 1 to 5 C atoms and the ratio of silicon atoms from the groups of the general formula (VII) to the metal atoms in the cross-linking agents (VIII) is 1:0 to 1:20, said solvent being largely water-miscible but capable of dissolving aminoorganosilanes according to formula (V) and organofunctional silanes according to formula (VI) as well as cross-linking agents according to formula (VIII), (b) adding an amount of water to the resulting solution under agitation which amount is at least sufficient for the complete hydrolysis and condensation of silanes to form a reaction mixture, allowing the reaction mixture to gel under further agitation at a certain temperature in a range from room temperature to 200° C., compounding the reaction mixture at the start of gelling or up to one hour thereafter with 10 to 2000%, by weight, of a solvent which is largely water-insoluble but which dissolves the reaction mixture which has gelled or started to gel, homogenizing said gel and adding 10 to 2000%, by weight water, said weights being relative to the total amount of aminoorganosilane (V), organofunctional silane (VI) and, optionally, cross-linking agents (VIII), to the viscous homogenizate formed thereby immediately or within a time frame of up to 3 hours, optionally under elevation of the originally set temperature of from room temperature to 200° C., adding the organofunctional silane and/or one or more cross-linking agents that were not added in step (a);

(c) dispersing the organic phase formed thereby, which now contains siloxane, in the liquid two-phase system formed thereby, separating the solid forming in the form of spheres from the liquid phase after a time sufficient for this purpose at a temperature ranging from room temperature to 200° C.

20. A method for the preparation of macroscopic spherical particles of random organosiloxane amine copolycondensate comprising (a) precondensing in a solvent a tertiary aminoorganosilane of the formula

  (V)

together with an organofunctional silane

  (VI)

corresponding to the desired stoichiometric composition of the copolycondensate to be prepared, wherein $R^7$ to $R^{11}$ are identical or different and signify a group of the formula $R^6$—Si(OR$^{12}$)$_3$  (VII)

R6 represents a linear or branched alkylene group with 1 to 10 C atoms, a cycloalkylene group with 5 to 8 C atoms or a unit of the formula

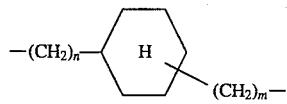

or

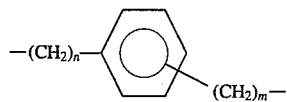

in which n is a number from 1 to 6 and indicates the number of methylene groups bound to nitrogen or in the X position and m is a number from 0 to 6,
$R^{12}$ signifies a linear or branched alkyl group with 1 to 5 C atoms and
X=>N—H, >N—CH$_3$, >N—C$_2$H$_5$, —S—, —S$_2$—, —S$_3$—, —S$_4$—,

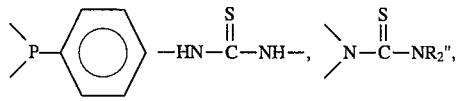

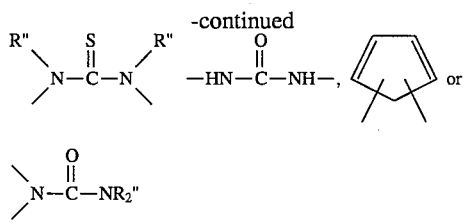

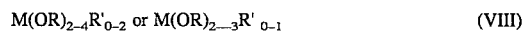

wherein R" is H or is a linear or branched alkyl group with 1 to 5 C atoms or a group (CH$_2$)$_n$—NR$_2$''', wherein n signifies a number from 1 to 6 and R''' is H or is a linear or branched alkyl group with 1 to 5 C atoms,
in the presence of an amount of water which is not sufficient for complete hydrolysis,
optionally after the addition of one or more cross-linking agents of the general formula M(OR)$_{2-4}$R'$_{0-2}$ or M(OR)$_{2-3}$R'$_{0-1}$  (VIII)

whereby M is a silicon, titanium, zirconium or aluminum atom, R' a linear or branched alkyl group with 1 to 5 C atoms or a phenyl group and
R signifies a linear or branched alkyl group with 1 to 5 C atoms and the ratio of silicon atoms from the groups of the general formula (VII) to the metal atoms in the cross-linking agents (VIII) is 1:0 to 1:20, said solvent being largely water-miscible but capable of dissolving aminoorganosilanes according to formula (V) and organofunctional silanes according to formula (VI) as well as cross-linking agents according to formula (VIII), (b) adding an amount of water to the resulting solution under agitation which amount is at least sufficient for the complete hydrolysis and condensation of silanes to form a reaction mixture, allowing the reaction mixture to gel under further agitation at a certain temperature in a range from room temperature to 200° C., compounding the reaction mixture at the start of gelling or up to one hour thereafter with 10 to 2000%, by weight of a solvent which is largely water-insoluble but which dissolves the reaction mixture which has gelled or started to gel, homogenizing said gel and adding 10 to 2000%, by weight water, said weights being relative to the total amount of aminoorganosilane (V), organofunctional silane (VI) and, optionally, cross-linking agents (VIII), to the viscous. homogenizate formed thereby immediately or within a time frame of up to 3 hours, optionally under elevation of the originally set temperature of from room temperature to 200° C.;

(c) dispersing the organic phase formed thereby, which now contains siloxane, in the liquid two-phase system formed thereby, separating the solid forming in the form of spheres from the liquid phase after a time sufficient for this purpose at a temperature ranging from room temperature to 200° C.

21. A method for the preparation of macroscopic spherical particles of block organosiloxane amine copolycondensate comprising (a) precondensing separately for 5 minutes to 48 hours, in the presence of an amount of water which is not sufficient for complete hydrolysis, optionally in the presence of solvent,
a tertiary aminoorganosilane of the formula

(V)

and an organofunctional silane

(VI)

corresponding to the desired stoichiometric composition of the copolycondensate to be prepared, wherein $R^7$ to $R^{11}$ are identical or different and signify a group of the formula $$R^6—Si(OR^{12})_3 \quad (VII)$$

$R^6$ represents a linear or branched alkylene group with 1 to 10 C atoms, a cycloalkylene group with 5 to 8 C atoms or a unit of the formula

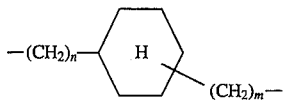

or

in which n is a number from 1 to 6 and indicates the number of methylene groups bound to nitrogen or in the X position and m is a number from 0 to 6,
$R^{12}$ signifies a linear or branched alkyl group with 1 to 5 C atoms and
$X = >N—H, >N—CH_3, >N—C_2H_5, —S—, —S_2—, —S_3—, —S_4—,$

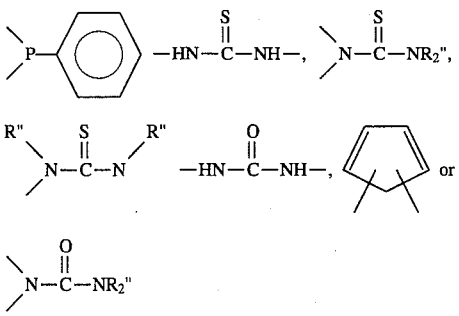

wherein R" is H or is a linear or branched alkyl group with 1 to 5 C atoms or a group $(CH_2)_n—NR_2'''$, wherein n signifies a number from 1 to 6 and R''' is H or is a linear or branched alkyl group with 1 to 5 C atoms,
and optionally one or more cross-linking agents of the general formula $$M(OR)_{2-4}R'_{0-2} \text{ or } M(OR)_{2-3}R'_{0-1} \quad (VIII)$$

whereby M is a silicon, titanium, zirconium or aluminum atom,
R' a linear or branched alkyl group with 1 to 5 C atoms or a phenyl group and R signifies a linear or branched alkyl group with 1 to 5 C atoms and the ratio of silicon atoms from the groups of the general formula (VII) to the metal atoms in the cross-linking agents (VIII) is 1:0 to 1:20, said solvent being largely water-miscible but capable of dissolving aminoorganosilanes according to formula (V) and organofunctional silanes according to formula (VI) as well as cross-linking agents according to formula (VIII), (b) combining said precondensates, (c) adding an amount of water to the resulting solution under agitation which amount is at least sufficient for the complete hydrolysis and condensation of silanes to form a reaction mixture, allowing the reaction mixture to gel under further agitation at a certain temperature in a range from room temperature to 200° C., compounding the reaction mixture at the start of gelling or up to one hour thereafter with 10 to 2000%, by weight, of a solvent which is largely water-insoluble but which dissolves the reaction mixture which has gelled or started to gel, homogenizing said gel and adding 10 to 2000%, by weight water, said weights being relative to the total amount of aminoorganosilane (V), organofunctional silane (VI) and, optionally, cross-linking agents (VIII), to the viscous homogenizate formed thereby immediately or within a time frame of up to 3 hours, optionally under elevation of the originally set temperature of from room temperature to 200° C.;

(d) dispersing the organic phase formed thereby, which now contains siloxane, in the liquid two-phase system formed thereby, separating the solid forming in the form of spheres from the liquid phase after a time sufficient for this purpose at a temperature ranging from room temperature to 200° C.

22. A method for the preparation of macroscopic spherical particles of mixed organosiloxane amine copolycondensate comprising (a) precondensing separately for 5 minutes to 48 hours, in the presence of an amount of water which is not sufficient for complete hydrolysis, optionally in the presence of solvent, at least one but not all of the following monomeric components:
a tertiary aminoorganosilane of the formula

(V)

an organofunctional silane

(VI)

corresponding to the desired stoichiometric composition of the copolycondensate to be prepared, wherein $R^7$ to $R^{11}$ are identical or different and signify a group of the formula $$R^6—Si(OR^{12})_3 \quad (VII)$$

$R^6$ represents a linear or branched alkylene group with 1 to 10 C atoms, a cycloalkylene group with 5 to 8 C atoms or a unit of the formula

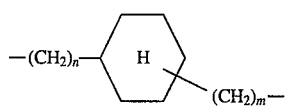

or

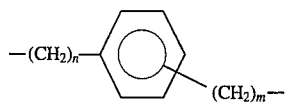

in which n is a number from 1 to 6 and indicates the number of methylene groups bound to nitrogen or in the X position and m is a number from 0 to 6, $R^{12}$ signifies a linear or branched alkyl group with 1 to 5 C atoms and

X=>N—H, >N—CH$_3$, >N—C$_2$H$_5$, —S—, —S$_2$—, —S$_3$—, —S$_4$—,

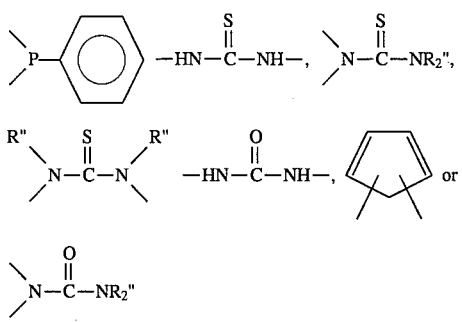

wherein R" is H or is a linear or branched alkyl group with 1 to 5 C atoms or a group (CH$_2$)$_n$—NR$_2$' ''', wherein n signifies a number from 1 to 6 and R''' is H or is a linear or branched alkyl group with 1 to 5 C atoms, and optionally one or more cross-linking agents of the general formula M(OR)$_{2-4}$R'$_{0-2}$ or M(OR)$_{2-3}$R'$_{0-1}$  (VIII)

whereby M is a silicon, titanium, zirconium or aluminum atom,

R' a linear or branched alkyl group with 1 to 5 C atoms or a phenyl group and

R signifies a linear or branched alkyl group with 1 to 5 C atoms and the ratio of silicon atoms from the groups of the general formula (VII) to the metal atoms in the cross-linking agents (VIII) is 1:0 to 1:20, said solvent being largely water-miscible but capable of dissolving aminoorganosilanes according to formula (V) and organofunctional silanes according to formula (VI) as well as cross-linking agents according to formula (VIII), (b) combining said precondensate or precondensates with the remaining non-precondensed monomeric components or components, (c) adding an amount of water to the resulting solution under agitation which amount is at least sufficient for the complete hydrolysis and condensation of silanes to form a reaction mixture, allowing the reaction mixture to gel under further agitation at a certain temperature in a range from room temperature to 200° C., compounding the reaction mixture at the start of gelling or up to one hour thereafter with 10 to 2000%, by weight, of a solvent which is largely water-insoluble but which dissolves the reaction mixture which has gelled or started to gel, homogenizing said gel and adding 10 to 2000%, by weight water, said weights being relative to the total amount of aminoorganosilane (V), organofunctional silane (VI) and, optionally, cross-linking agents (VIII), to the viscous homogenizate formed thereby immediately or within a time frame of up to 3 hours, optionally under elevation of the originally set temperature of from room temperature to 200° C.;

(d) dispersing the organic phase formed thereby, which now contains siloxane, in the liquid two-phase system formed thereby, separating the solid forming in the form of spheres from the liquid phase after a time sufficient for this purpose at a temperature ranging from room temperature to 200° C.

23. A method for the preparation of macroscopic spherical particles of random organosiloxane amine copolycondensate comprising dissolving in a solvent a tertiary aminoorganosilane of the formula

together with an organofunctional silane

corresponding to the desired stoichiometric composition of the copolycondensate to be prepared, wherein $R^7$ to $R^{11}$ are identical or different and signify a group of the formula $R^6$—Si(OR$^{12}$)$_3$  (VII)

$R^6$ represents a linear or branched alkylene group with 1 to 10 C atoms, a cycloalkylene group with 5 to 8 C atoms or a unit of the formula

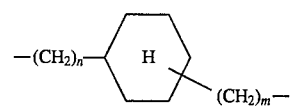

or

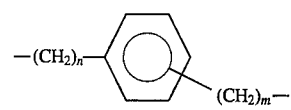

in which n is a number from 1 to 6 and indicates the number of methylene groups bound to nitrogen or in the X position and m is a number from 0 to 6, $R^{12}$ signifies a linear or branched alkyl group with 1 to 5 C atoms and

X=>N—H, >N—CH$_3$, >N—CH$_2$H$_5$, —S—, —S$_2$—, —S$_3$—, —S$_4$—,

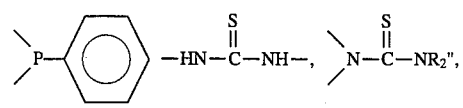

-continued

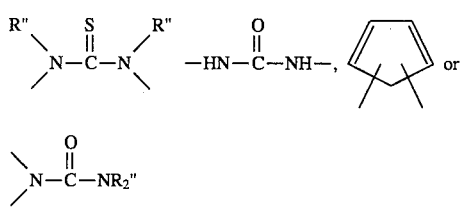

wherein R" is H or is a linear or branched alkyl group with 1 to 5 C atoms or a group $(CH_2)_n-NR_2'''$, wherein n signifies a number from 1 to 6 and R''' is H or is a linear or branched alkyl group with 1 to 5 C atoms,
optionally after the addition of one or more cross-linking agents of the general formula $$M(OR)_{2-4}R'_{0-2} \text{ or } M(OR)_{2-3}R'_{0-1} \qquad (VIII)$$

whereby M is a silicon, titanium, zirconium or aluminum atom,
R' a linear or branched alkyl group with 1 to 5 C atoms or a phenyl group and
R signifies a linear or branched alkyl group with 1 to 5 C atoms and the ratio of silicon atoms from the groups of the general formula (VII) to the metal atoms in the cross-linking agents (VIII) is 1:0 to 1:20, said solvent being largely water-miscible but capable of dissolving aminoorganosilanes according to formula (V) and organofunctional silanes according to formula (VI) as well as cross-linking agents according to formula (VIII), adding an amount of water to the resulting solution under agitation which amount is at least sufficient for the complete hydrolysis and condensation of silanes to form a reaction mixture, allowing the reaction mixture to gel under further agitation at a certain temperature in a range from room temperature to 200° C., compounding the reaction mixture at the start of gelling or up to one hour thereafter with 10 to 2000%, by weight, of a solvent which is largely water-insoluble but which dissolves the reaction mixture which has gelled or started to gel, homogenizing said gel and adding 50 to 500%, by weight water, said weights being relative to the total amount of aminoorganosilane (V), organofunctional silane (VI) and, optionally, cross-linking agents (VIII), to the viscous homogenizate formed thereby immediately or within a time frame of up to 3 hours, optionally under elevation of the originally set temperature of from room temperature to 200° C.;

dispersing the organic phase formed thereby, which now contains siloxane, in the liquid two-phase system formed thereby, separating the solid forming in the form of spheres from the liquid phase after a time sufficient for this purpose at a temperature ranging from room temperature to 200° C.

24. The method according to claim 20 wherein said solvent in step (a) is an alcohol with 1 to 5 C atoms corresponding to the alkoxy groups.

25. The method according to claim 20 wherein said amount of water in step (a) is from 1 to 100 mole % of the amount required for complete hydrolysis.

26. The method according to claim 20, wherein said precondensation in step (a) is carried out in the presence of an acidic, basic or metal-containing condensation catalyst.

27. The method according to claim 21, wherein said precondensation is carried out in the presence of an acidic, basic or metal-containing condensation catalyst.

28. The method according to claim 19, comprising adding 50 to 500% by weight of water to said viscous homogenizate.

29. The method according to claim 19, comprising adding 10 to 500% by weight of water to said viscous homogenizate.

30. The method according to claim 19, comprising adding 27.4 to 215% by weight of water to said viscous homogenlzate.

31. The method according to claim 20, comprising adding 50 to 500% by weight of water to said viscous homogenlzate.

32. The method according to claim 20, comprising adding 10 to 500% by weight of water to said viscous homogenizate.

33. The method according to claim 20, comprising adding 27.4 to 215% by weight of water to said viscous homogenizate.

34. The method according to claim 21, comprising adding 50 to 500% by weight of water to said viscous homogenlzate.

35. The method according to claim 21, comprising adding 10 to 500% by weight of water to said viscous homogenlzate.

36. The method according to claim 21, comprising adding 27.4 to 215% by weight of water to said viscous homogenizate.

37. The method according to claim 22, comprising adding 50 to 500% by weight of water to said viscous homogenizate.

38. The method according to claim 22, comprising adding 10 to 500% by weight of water to said viscous homogenizate.

39. The method according to claim 22, comprising adding 27.4 to 215% by weight of water to said viscous homogenizate.

* * * * *